US012675859B2

(12) United States Patent
Kwong et al.

(10) Patent No.: US 12,675,859 B2
(45) Date of Patent: Jul. 7, 2026

(54) SYSTEM AND METHOD FOR ASSESSING THE QUALITY OF A HIGH-DYNAMIC RANGE (HDR) IMAGE

(71) Applicant: Centre for Intelligent Multidimensional Data Analysis Limited, Pak Shek Kok (HK)

(72) Inventors: Tak Wu Sam Kwong, Pak Shek Kok (HK); Zhangkai Ni, Pak Shek Kok (HK); Yue Liu, Pak Shek Kok (HK); Shiqi Wang, Pak Shek Kok (HK)

(73) Assignee: Centre for Intelligent Multidimensional Data Analysis Limited, Pak Shek Kok (HK)

( * ) Notice: Subject to any disclaimer, the term of this patent is extended or adjusted under 35 U.S.C. 154(b) by 307 days.

(21) Appl. No.: 18/153,129

(22) Filed: Jan. 11, 2023

(65) Prior Publication Data

US 2024/0233102 A1 Jul. 11, 2024

(51) Int. Cl.
G06T 7/00 (2017.01)
G06T 5/10 (2006.01)
(Continued)

(52) U.S. Cl.
CPC .............. G06T 7/0002 (2013.01); G06T 5/10 (2013.01); G06V 10/449 (2022.01); G06V 10/60 (2022.01);
(Continued)

(58) Field of Classification Search
CPC .................... G06T 7/0002; G06T 5/10; G06T 2207/20056; G06T 2207/20208;
(Continued)

(56) References Cited

U.S. PATENT DOCUMENTS 10,113,910 B2 * 10/2018 Brunk .................... G01J 3/2803
10,789,696 B2 * 9/2020 Po .......................... G06N 3/045
(Continued)

OTHER PUBLICATIONS

H. Guo, K.-K. Ma and H. Zeng, "A Log-Gabor Feature-Based Quality Assessment Model for Screen Content Images," 2019 IEEE International Conference on Image Processing (ICIP), Taipei, Taiwan, 2019, pp. 4499-4503, doi: 10.1109/ICIP.2019.8803491. (Year: 2019).*

(Continued)

*Primary Examiner* — Gregory A Morse
*Assistant Examiner* — Ronde Lee Miller
(74) *Attorney, Agent, or Firm* — FASKEN MARTINEAU DUMOULIN LLP; Kimberly A. Peaslee

(57) ABSTRACT

A system and a method for assessing quality of a high-dynamic range (HDR) image. The system comprises a feature extraction module arranged to extract a plurality of frequency features on a pair of reference image and a distorted image generated based on the reference image; a comparison module arranged to compare a pair of feature maps obtained by processing the extracted frequency features on both the reference image and the distorted image; and a scoring module arrange to output an image quality assessment (IQA) score of the distorted image with reference to the reference image provided; wherein the plurality of frequency features are associated with sensitive information in a human visual system (HVS).

20 Claims, 4 Drawing Sheets

(51) Int. Cl.
  *G06V 10/44* (2022.01)
  *G06V 10/60* (2022.01)
  *G06V 10/74* (2022.01)
  *G06V 10/771* (2022.01)

(52) U.S. Cl.
  CPC .......... *G06V 10/761* (2022.01); *G06V 10/771* (2022.01); *G06T 2207/20056* (2013.01); *G06T 2207/20208* (2013.01); *G06T 2207/30168* (2013.01)

(58) Field of Classification Search
  CPC ........ G06T 2207/30168; G06V 10/449; G06V 10/60; G06V 10/761; G06V 10/771
  See application file for complete search history.

(56) References Cited

U.S. PATENT DOCUMENTS

| | | | | |
|---|---|---|---|---|
| 2011/0295510 | A1* | 12/2011 | Gulati | G01V 1/288 345/419 |
| 2012/0281924 | A1* | 11/2012 | Coulombe | H04N 19/85 382/218 |
| 2022/0405927 | A1* | 12/2022 | Villard | A61B 3/0008 |
| 2024/0233102 | A1* | 7/2024 | Kwong | G06T 5/10 |
| 2024/0233343 | A1* | 7/2024 | Mayster | G06V 10/764 |
| 2024/0312016 | A1* | 9/2024 | Lavoie | G06T 5/10 |

OTHER PUBLICATIONS

Cheng et al. "Full Reference Screen Content Image Quality Assessment by Fusing Multi-level Structure Similarity" 2020 https://arxiv.org/abs/2008.05396 (Year: 2020).*

Yue Liu, Zhangkai Ni, Shiqi Wang, Hanli Wang, Sam Kwong "High Dynamic Range Image Quality Assessment Based on Frequency Disparity" https://arxiv.org/abs/2209.02285 (2022) (Year: 2022).*

Kuang Dehe; Ni, Zhangkai; Liu, Yue; Wang, Shiqi "High Dynamic Range Image Quality Evaluation Algorithm Based on Frequency Difference" Google Patents (2023)—Original (Year: 2023).*

Kuang Dehe; Ni, Zhangkai; Liu, Yue; Wang, Shiqi "High Dynamic Range Image Quality Evaluation Algorithm Based on Frequency Difference" Google Patents (2023)—Translated (Year: 2023).*

* cited by examiner

| Criteria |  | SROCC |  |  |  |  | KROCC |  |  |  |  | RMSE |  |  |  |  |
|---|---|---|---|---|---|---|---|---|---|---|---|---|---|---|---|---|
| Datasets |  | D-V | D-Z | D-N | UPIQ | Avg. | D-V | D-Z | D-N | UPIQ | Avg. | D-V | D-Z | D-N | UPIQ | Avg. |
| HDR-VQM |  | 0.8965 | 0.7611 | 0.7248 | 0.8858 | 0.8178 | 0.7031 | 0.5621 | 0.5649 | 0.7002 | 0.6326 | 12.2101 | 18.8356 | 0.8189 | 0.3819 | 8.0616 |
| HDR-VDP-3 |  | 0.9132 | 0.7558 | 0.8467 | 0.8214 | 0.8343 | 0.7392 | 0.5698 | 0.6718 | 0.6421 | 0.6557 | 10.7257 | 19.6734 | 0.5470 | 0.4089 | 7.8388 |
| SSIM | PU | 0.8699 | 0.7827 | 0.7087 | 0.7369 | 0.7738 | 0.6719 | 0.5787 | 0.5332 | 0.5488 | 0.5832 | 14.0147 | 18.7897 | 0.8298 | 0.5258 | 8.5400 |
| SSIM | PQ | 0.8736 | 0.7682 | 0.6508 | 0.7315 | 0.7500 | 0.6850 | 0.5783 | 0.4870 | 0.5486 | 0.5747 | 14.3140 | 19.4345 | 0.8665 | 0.5132 | 8.8321 |
| MSSIM | PU | 0.9009 | 0.8004 | 0.8377 | 0.8063 | 0.8363 | 0.7261 | 0.6098 | 0.6622 | 0.6113 | 0.6524 | 12.1315 | 29.1735 | 0.7774 | 0.5162 | 10.6497 |
| MSSIM | PQ | 0.8994 | 0.8417 | 0.8299 | 0.8118 | 0.8457 | 0.7113 | 0.6458 | 0.6529 | 0.6197 | 0.6574 | 11.8489 | 15.8932 | 0.7801 | 0.5023 | 7.2561 |
| PSNR | PU | 0.6672 | 0.6591 | 0.6131 | 0.6311 | 0.6426 | 0.4797 | 0.4760 | 0.4517 | 0.4582 | 0.4664 | 22.6432 | 21.8065 | 0.8581 | 0.5208 | 11.4572 |
| PSNR | PQ | 0.6681 | 0.6476 | 0.6198 | 0.6327 | 0.6421 | 0.4797 | 0.4632 | 0.4571 | 0.4588 | 0.4645 | 21.3461 | 20.0826 | 0.8619 | 0.5147 | 10.7013 |
| GMSD | PU | 0.8918 | 0.8738 | 0.8080 | 0.7784 | 0.8380 | 0.7064 | 0.6919 | 0.6224 | 0.5824 | 0.6508 | 12.0439 | 13.4912 | 0.6487 | 0.4357 | 6.6549 |
| GMSD | PQ | 0.8846 | 0.8719 | 0.7979 | 0.7696 | 0.8310 | 0.6900 | 0.6886 | 0.6134 | 0.5735 | 0.6414 | 12.3418 | 13.6594 | 0.6798 | 0.4450 | 6.7840 |
| FSIM | PU | 0.9080 | 0.8337 | 0.8323 | 0.7693 | 0.8361 | 0.7376 | 0.6571 | 0.6525 | 0.5782 | 0.6544 | 11.8094 | 15.4822 | 0.7790 | 0.5258 | 7.1491 |
| FSIM | PQ | 0.9064 | 0.8358 | 0.8213 | 0.7648 | 0.8321 | 0.7392 | 0.6583 | 0.6401 | 0.5669 | 0.6511 | 11.7802 | 15.5461 | 0.8005 | 0.5378 | 7.1662 |
| VIF | PU | 0.9183 | 0.8384 | 0.6705 | 0.7640 | 0.7953 | 0.7372 | 0.6737 | 0.5067 | 0.5838 | 0.6254 | 11.4667 | 17.3586 | 0.7738 | 0.4233 | 7.4956 |
| VIF | PQ | 0.9158 | 0.8283 | 0.6631 | 0.7568 | 0.7910 | 0.7307 | 0.6753 | 0.4977 | 0.5761 | 0.6200 | 11.4650 | 18.2018 | 0.7442 | 0.4309 | 7.7105 |
| ESIM | PU | 0.9176 | 0.8866 | 0.7763 | 0.8559 | 0.8591 | 0.7392 | 0.7137 | 0.5932 | 0.6762 | 0.6806 | 12.4762 | 13.8699 | 0.6487 | 0.3565 | 6.8378 |
| ESIM | PQ | 0.9139 | 0.8836 | 0.7685 | 0.8529 | 0.8547 | 0.7392 | 0.7088 | 0.5863 | 0.6720 | 0.6766 | 12.5785 | 13.7950 | 0.6480 | 0.3518 | 6.8433 |
| GFM | PU | 0.9052 | 0.9154 | 0.7182 | 0.7848 | 0.8309 | 0.7162 | 0.7485 | 0.5400 | 0.5890 | 0.6484 | 11.7361 | 10.8275 | 0.7617 | 0.4494 | 5.9437 |
| GFM | PQ | 0.8984 | 0.9088 | 0.7119 | 0.7693 | 0.8221 | 0.7113 | 0.7359 | 0.5380 | 0.5738 | 0.6398 | 11.9960 | 17.8278 | 0.7922 | 0.4767 | 7.7732 |
| LGFM | PU | 0.9208 | 0.9322 | 0.8539 | 0.9032 | 0.9023 | 0.7491 | 0.7787 | 0.6824 | 0.7236 | 0.7315 | 10.6462 | 10.5293 | 0.5392 | 0.3897 | 5.5061 |
| LGFM | PQ | 0.9195 | 0.9207 | 0.8611 | 0.8928 | 0.8985 | 0.7458 | 0.7634 | 0.6833 | 0.7070 | 0.7249 | 11.4299 | 10.9682 | 0.5523 | 0.3072 | 5.8144 |

FIG. 4

SYSTEM AND METHOD FOR ASSESSING THE QUALITY OF A HIGH-DYNAMIC RANGE (HDR) IMAGE

TECHNICAL FIELD

The invention relates to a system and a method for assessing the quality of a high-dynamic range (HDR) image, and particularly, although not exclusively, to a Full-Reference (FR) Image Quality Assessment (IQA) method for HDR images based on frequency disparity.

BACKGROUND

With the rapid development of imaging technology and the growing demand for immersive experiences, the high dynamic range (HDR) images are increasingly indispensable due to the realistic experiences they can provide, which can significantly contribute to the development of TV and photography industry.

Compared with the 8-bit low dynamic range (LDR) images, HDR images are linearly related to the physical luminance in the scene and can record more structural details by using 16-32 bit floating point values. Generally speaking, there may be two key differences between HDR and LDR images, 1) the data distribution of HDR images is much broader than that of LDR images; and 2) more detailed structures can be preserved in HDR images.

SUMMARY OF THE INVENTION

In accordance with a first aspect of the present invention, there is provided a system for assessing quality of a high-dynamic range (HDR) image, comprising a feature extraction module arranged to extract a plurality of frequency features on a pair of reference image and a distorted image generated based on the reference image; a comparison module arranged to compare a pair of feature maps obtained by processing the extracted frequency features on both the reference image and the distorted image; and a scoring module arrange to output an image quality assessment (IQA) score of the distorted image with reference to the reference image provided; wherein the plurality of frequency features are associated with sensitive information in a human visual system (HVS).

In accordance with the first aspect, the plurality of frequency features are associated with structural information and/or partial frequencies when a visual scene presented by the image is perceived by a human observer.

In accordance with the first aspect, the plurality of frequency features includes a local frequency feature and a global frequency feature.

In accordance with the first aspect, the feature extraction module comprises a Gabor Filter arranged to extract the local frequency feature associated with a high-frequency component of the image In accordance with the first aspect, the Gabor filter is arranged to extract horizontal and vertical edge features on the image, and wherein the local frequency feature is extracted by applying a spatial mask on the extracted horizontal and vertical edge features with high luminance.

In accordance with the first aspect, the feature extraction module comprises a Butterworth filter arranged to extract the global frequency feature from a frequency spectrum of the image.

In accordance with the first aspect, the Butterworth filter is arranged to compose a frequency map and a phase map associated with image, wherein the frequency map and the phase map are obtained by: obtaining a frequency spectrum representation by performing a Discrete Fourier Transform (DFT) to the image associated with a frequency representation of each pixel of the image in the spatial domain; applying a bandpass Butterworth filter to provide high weights to a predetermined frequency interval; and separating the frequency spectrum representation into real part and imaginary part to obtain the frequency may and the phase map.

In accordance with the first aspect, the system further comprises an image pre-processing module arranged to transfer the reference image and the distorted image to a perceptual space to map a wide range of luminance to a perceptual range of the HVS.

In accordance with the first aspect, the comparison module is arranged to generate a similarity map associated with each of the local frequency feature and the global frequency features of the reference image and the distorted image pair.

In accordance with the first aspect, the scoring module is arranged to perform feature pooling to generate local similarity score and the global frequency similarity score associated with a weighted similarity of all pixels on the distorted image comparing to the reference image, and arranged to obtain a final IQA score by combining the local similarity score and the global frequency similarity score.

In accordance with a second aspect of the present invention, there is provided a method for assessing quality of a high-dynamic range (HDR) image, comprising the steps of: extracting a plurality of frequency features on a pair of reference image and a distorted image generated based on the reference image; comparing a pair of feature maps obtained by processing the extracted frequency features on both the reference image and the distorted image; and outputting an image quality assessment (IQA) score of the distorted image with reference to the reference image provided; wherein the plurality of frequency features are associated with sensitive information in a human visual system (HVS).

In accordance with the second aspect, the plurality of frequency features are associated with structural information and/or partial frequencies when a visual scene presented by the image is perceived by a human observer.

In accordance with the second aspect, the plurality of frequency features includes a local frequency feature and a global frequency feature.

In accordance with the second aspect, the step of extracting a plurality of frequency features comprising the step of applying a Gabor Filter to extract the local frequency feature associated with a high-frequency component of the image In accordance with the second aspect, the Gabor filter is arranged to extract horizontal and vertical edge features on the image, and wherein the local frequency feature is extracted by applying a spatial mask on the extracted horizontal and vertical edge features with high luminance.

In accordance with the second aspect, the step of extracting a plurality of frequency features comprising the step of applying a Butterworth filter arranged to extract the global frequency feature from a frequency spectrum of the image.

In accordance with the second aspect, the Butterworth filter is arranged to compose a frequency map and a phase map associated with image, wherein the frequency map and the phase map are obtained by: obtaining a frequency spectrum representation by performing a Discrete Fourier Transform (DFT) to the image associated with a frequency representation of each pixel of the image in the spatial domain; applying a bandpass Butterworth filter to provide high weights to a predetermined frequency interval; and separating the frequency spectrum representation into real part and imaginary part to obtain the frequency may and the phase map.

In accordance with the second aspect, the method further comprises a step of preforming pre-processing of the reference image and the distorted image by transferring the reference image and the distorted image to a perceptual space to map a wide range of luminance to a perceptual range of the HVS.

In accordance with the second aspect, the step of comparing a pair of feature maps comprising the step of generating a similarity map associated with each of the local frequency feature and the global frequency features of the reference image and the distorted image pair.

In accordance with the second aspect, the step of outputting an image quality assessment (IQA) score of the distorted image comprising the steps of performing feature pooling to generate local similarity score and the global frequency similarity score associated with a weighted similarity of all pixels on the distorted image comparing to the reference image, and arranged to obtaining a final IQA score by combining the local similarity score and the global frequency similarity score.

BRIEF DESCRIPTION OF THE DRAWINGS

Embodiments of the present invention will now be described, by way of example, with reference to the accompanying drawings in which:

FIG. 4 is an illustration of Table I, which includes the results for SROCC, KROCC and RMSE comparison of various IQA Models on four used benchmarks.

DETAILED DESCRIPTION OF THE PREFERRED EMBODIMENT OF THE INVENTION

The inventors devised that some image quality assessment (IQA) methods designed for LDR images are not suitable for direct use in assessing the quality of HDR images, therefore it is necessary to develop effective IQA models for HDR images. The IQA models aim to objectively evaluate the image quality to align with the human visual system (HVS). As a fundamental problem in the field of image processing, IQA models may be used to optimize the performance of various learning-based vision tasks and to improve image encoding capability by increasing compression ratio while preserving the original image quality.

According to the amount of available information of the reference image, example IQA models may be roughly divided into three categories, full-reference (FR), reduced-reference (RR), and no-reference (NR). In this disclosure, preferred embodiments of FR IQA model for HDR images are described.

Due to the lack of IQA measures specifically designed for HDR images, in some example embodiments, objective LDR IQA models may be used to evaluate the quality of HDR images. However, the data distribution of the HDR image is quite different from that of the LDR image. Therefore the LDR IQA images are not directly suitable for the evaluating HDR images In one embodiment, a novel full-reference HDR IQA metric is constructed by modeling the HVS-sensitive information with local and global frequency characters to further improve the assessment accuracy. Advantageously, a Local and Global Frequency feature-based Model (LGFM) is mainly inspired by two observations. First, the local frequency feature can well represent the texture details perceived by human eyes. Second, the global frequency feature can be used to characterize the sensitive frequency interval of the HVS.

In one preferred embodiment, the reference and distorted HDR images are first transferred to the perceptual space using the Perceptual Unit (PU) coding. Thereafter, local and global frequency feature maps are extracted by specifically designed Gabor filtering and Butterworth filtering, respectively. The similarity measurements and pooling strategies are performed on the feature maps to generate similarity scores of local and global frequency features, respectively. The final prediction quality score is obtained by multiplying these two scores. Abundant experiments demonstrate the superiority of the LGFM method/system in the evaluation of the HDR image quality compared with the state-of-the-art IQA algorithms.

Advantageously, the present invention—HDR IQA may be used to significantly improve the assessment accuracy of the HDR image, which can be used for optimization of image content reconstruction and compression, etc.

Figure 1:
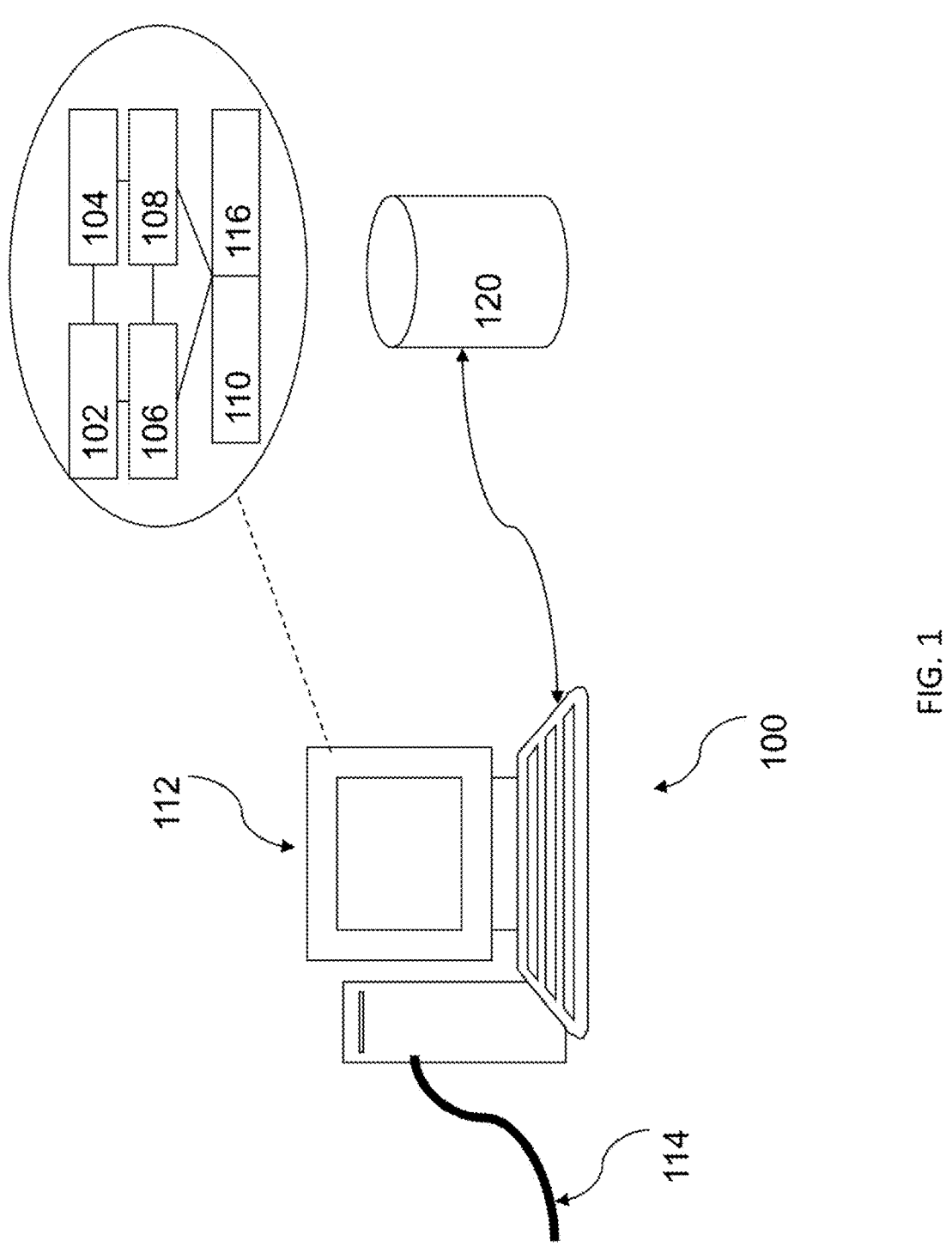
FIG. 1 is a schematic diagram of a computer server which is arranged to be implemented as system for assessing quality of a high-dynamic range (HDR) image in accordance with an embodiment of the present invention.

Referring to FIG. 1, an embodiment of the present invention is illustrated. This embodiment is arranged to provide a system for assessing quality of a high-dynamic range (HDR) image, comprising: a feature extraction module arranged to extract a plurality of frequency features on a pair of reference image and a distorted image generated based on the reference image; a comparison module arranged to compare a pair of feature maps obtained by processing the extracted frequency features on both the reference image and the distorted image; and a scoring module arrange to output an image quality assessment (IQA) score of the distorted image with reference to the reference image provided; wherein plurality of frequency features are associated with sensitive information in a human visual system (HVS).

In this example embodiment, the interface and processor are implemented by a computer having an appropriate user interface. The computer may be implemented by any computing architecture, including portable computers, tablet computers, stand-alone Personal Computers (PCs), smart devices, Internet of Things (IOT) devices, edge computing devices, client/server architecture, "dumb" terminal/mainframe architecture, cloud-computing based architecture, or any other appropriate architecture. The computing device may be appropriately programmed to implement the invention.

The system may be used to receive a pair of images, namely a raw or reference image, and a distorted image transformed by compressing or manipulating the raw image, and provide a IQA score representing a quality of the distorted image with reference to the reference image. The obtained score may be useful for indicating the quality of the image obtained by an image compressing tool. Alternatively, in case of video clips, the quality of the video sequences obtained by a video compressor engine or the compression codec and/or codec parameters, by referencing to the IQA scores associated with the distorted/compressed image.

As shown in FIG. 1 there is a shown a schematic diagram of a computer system or computer server 100 which is arranged to be implemented as an example embodiment of a system for assessing quality of an HDR image. In this embodiment the system comprises a server 100 which includes suitable components necessary to receive, store and execute appropriate computer instructions. The components may include a processing unit 102, including Central Processing United (CPUs), Math Co-Processing Unit (Math Processor), Graphic Processing United (GPUs) or Tensor processing united (TPUs) for tensor or multi-dimensional array calculations or manipulation operations, read-only memory (ROM) 104, random access memory (RAM) 106, and input/output devices such as disk drives 108, input devices 110 such as an Ethernet port, a USB port, etc. Display 112 such as a liquid crystal display, a light emitting display or any other suitable display and communications links 114. The server 100 may include instructions that may be included in ROM 104, RAM 106 or disk drives 108 and may be executed by the processing unit 102. There may be provided a plurality of communication links 114 which may variously connect to one or more computing devices such as a server, personal computers, terminals, wireless or hand-held computing devices, Internet of Things (IoT) devices, smart devices, edge computing devices. At least one of a plurality of communications link may be connected to an external computing network through a telephone line or other type of communications link.

The server 100 may include storage devices such as a disk drive 108 which may encompass solid state drives, hard disk drives, optical drives, magnetic tape drives or remote or cloud-based storage devices. The server 100 may use a single disk drive or multiple disk drives, or a remote storage service 120. The server 100 may also have a suitable operating system 116 which resides on the disk drive or in the ROM of the server 100.

The computer or computing apparatus may also provide the necessary computational capabilities to operate or to interface with a machine learning network, such as neural networks, to provide various functions and outputs. The neural network may be implemented locally, or it may also be accessible or partially accessible via a server or cloud-based service. The machine learning network may also be untrained, partially trained or fully trained, and/or may also be retrained, adapted or updated over time.

Figure 2:
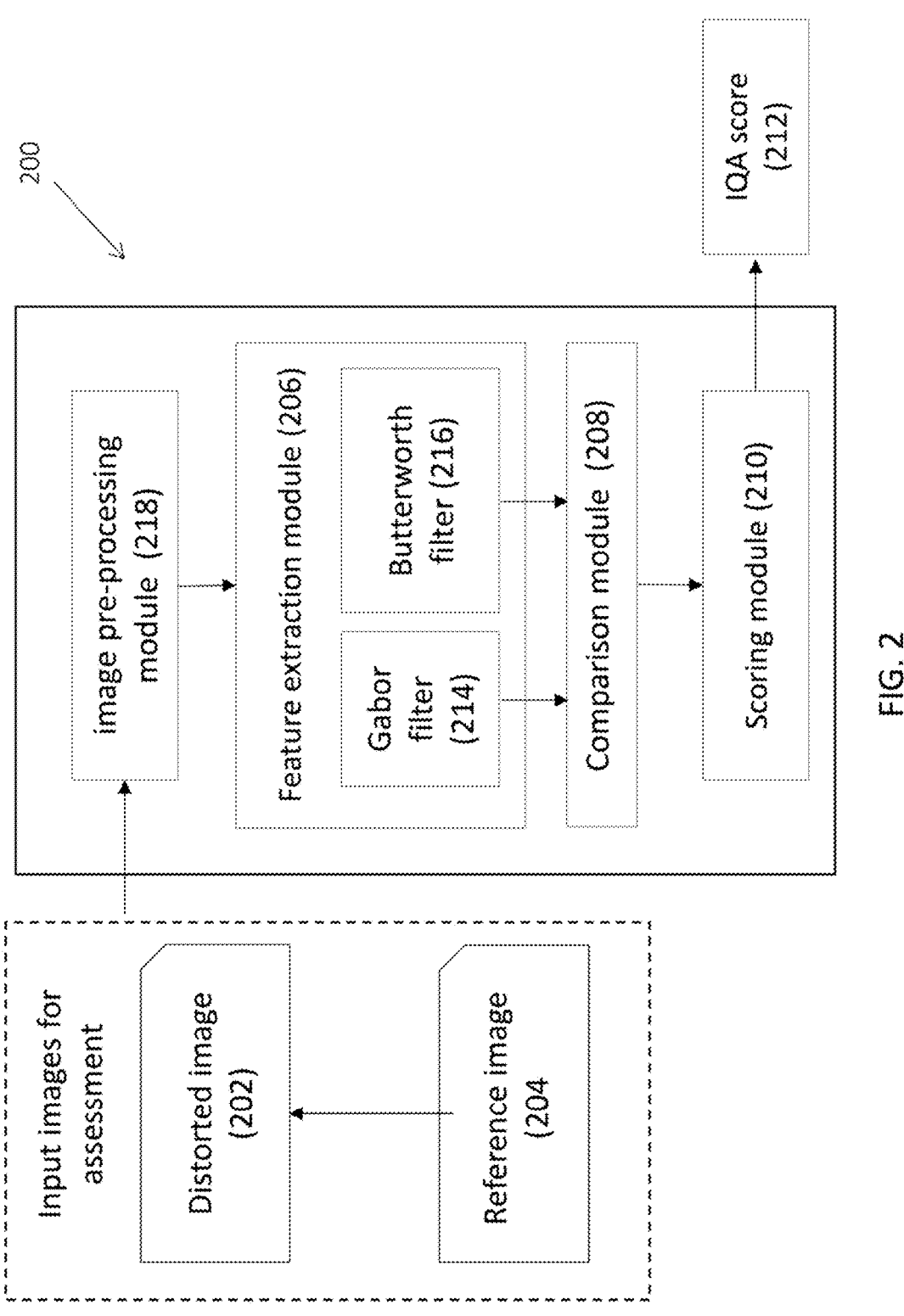
FIG. 2 is a block diagram showing a system for assessing quality of a high-dynamic range (HDR) image in accordance with an embodiment of the present invention.

With reference to FIG. 2, there is shown an embodiment of the system 200 for assessing quality of an HDR image. In this embodiment, the server 100 is used as part of a system 200 as arranged to receive input images, such as a distorted image 202 and an "original" image, i.e. a reference image 204, which may be processed to generate the distorted image 202. For example, an image may be added with noise after image acquisition/registration, and the added noise may be observable by human beings. In an alternative example, transmission error, such as JPEG transmission error, may be introduced to a distorted image during data transmission.

Other types of distortion may include additive Gaussian noise, additive noise in color components, spatially correlated noise, masked noise, high frequency noise, impulse noise, quantization noise, Gaussian blur, image denoising, JPEG/JPEG200 compression, JPEG/JPEG2000 transmission errors, non-eccentricity pattern noise, local block-wise distortions of different intensity, mean shift/intensity shift and contrast change. All these distortions "degrade" the quality of an image perceived by a human being.

In addition, image manipulations such as watermarking, color transformations, geometric transformations may also introduce distortion to an image, thus may affect a score associated with a quality of the distorted image.

Referring to FIG. 2, the system comprises a feature extraction module 206 arranged to extract a plurality of frequency features on a pair of reference image 204 and a distorted image 202 generated based on the reference image 204. Preferably, the feature extraction module 206 may be an image processor which extract all important features such as edges of features/objects being captured, alternatively, other features such as background of a scene may be identified by the feature extraction module 206. The extracted features may be useful for further processing, so as to facilitate assessment of the quality of the overall images based on the integrity of these features presented on the distorted image 202.

In one preferred embodiment, quality of the distorted image 202 may be assessed by comparing the extracted features presented on the distorted image 202 to the same set of features presented on the reference image 204. Preferably, the system 200 further comprises a comparison module 208 arranged to compare a pair of feature maps obtained by processing the extracted frequency features on both the reference image 204 and the distorted image 202.

Without wishing to be bound by theory, it may be appreciated that distorted/converted image are as much similar as the raw image, which may be uncompressed or introduced with least amount of error or loss of details. In other words, distorted image with more identifiable errors or deviations may be assessed as having a lower quality, or a higher IQA score (lower the better) as appreciated by a skilled person in the art.

For example, if the extracted features presented on the distorted image 202 deviate significantly from those on the reference image 204, the comparison module 208 may identify all deviation which may affect the perception of the image scene and the features presented on the image as a whole. To further facilitate effective and accurate comparison, feature maps may be generated by the feature extraction module 206, using different filters, such as a Gabor filter 214 and a Butterworth filter 216, which helps extracting different features with different attributes, or focusing on different aspects, and generating necessary maps for further processing. Detail explanations of the operations of the filters are described later in this disclosure.

Preferably, the plurality of frequency features are associated with structural information and/or partial frequencies when a visual scene presented by the image is perceived by a human observer, and the frequency features may include local frequency feature and a global frequency feature which may be extracted using Gabor filter 214 and Butterworth filter 216. These filters may be useful for extracting different frequency features with different focus.

In addition, the system 200 further comprises a scoring module 210 arrange to output an image quality assessment (IQA) score 212 of the distorted image 202 with reference to the reference image 204 provided. For example, the difference or deviation of the features presented on the distorted image 202 may be scored differently based on their level of deviation as well as impact on the image, taking into consideration that the distorted image 202 is observed by human being. Preferably, the final IQA score 212 may be a sum of differences or weighted differences of all features identified on the distorted image 202 when comparing to those on the reference image 204.

7
8

Figure 3:
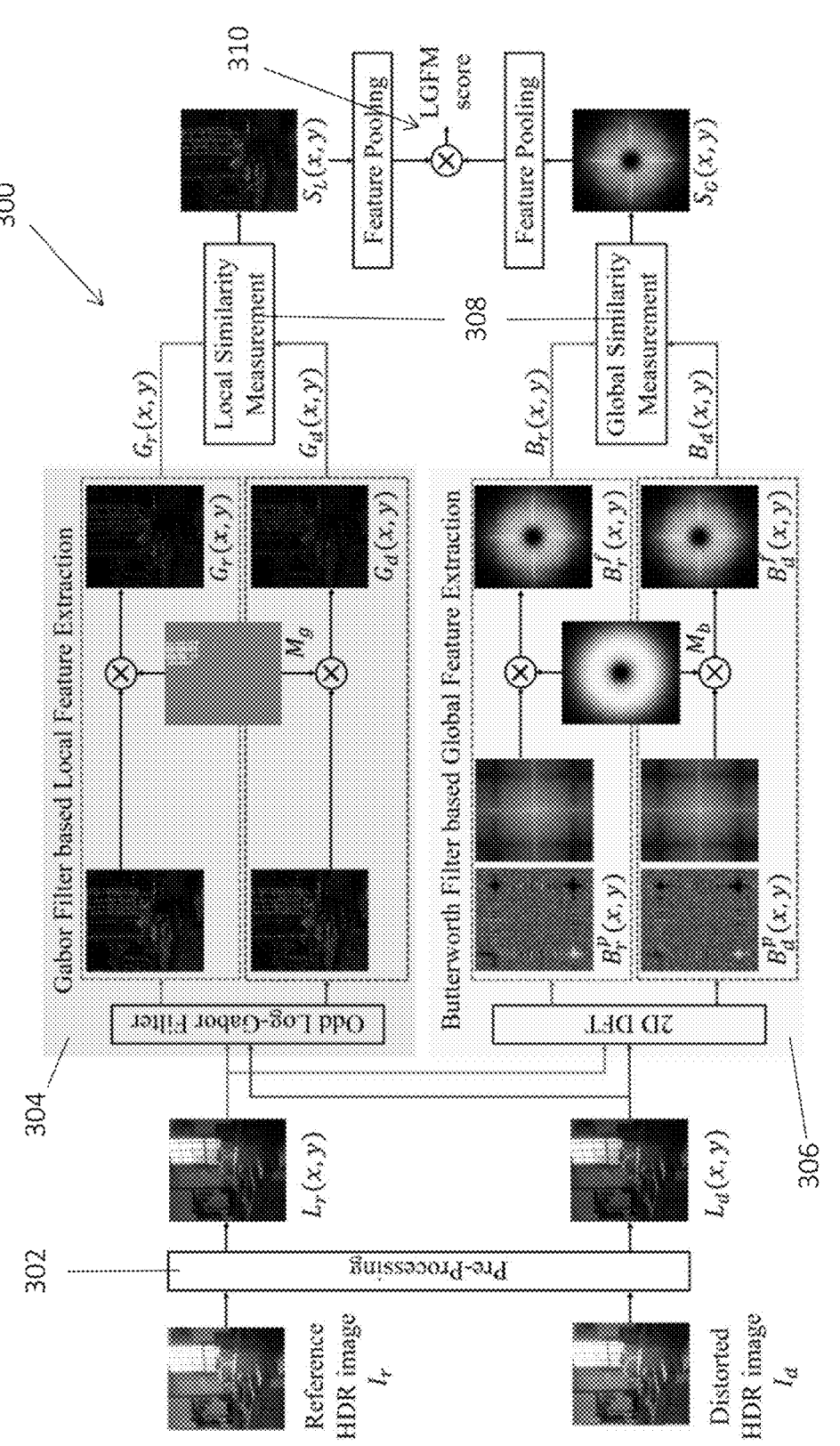
FIG. 3 is a flowchart of the method for assessing quality of a high-dynamic range (HDR) image in accordance with an embodiment of the present invention.

With reference also to FIG. 3, there is shown an example framework 300 of the system 200, in which the inventors named it a Local and Global Frequency feature-based Model (LGFM). In this preferred embodiment, the LGFM consists of four processing stages, starting with an optional step of preforming at stage 302, e.g. by an image pre-processing module 218 referring to FIG. 2, pre-processing of the reference image and the distorted image by transferring the reference image and the distorted image to a perceptual space to map a wide range of luminance to a perceptual range of the HVS, and followed by the steps of extracting the features, comparing the differences of the features on the image pair, and calculating the IQA score as previously described.

In this example, firstly, the reference and distorted HDR image, $I_r$ and $I_d$, are converted to the perceptual space in the pre-processing stage 302. The corresponding luminance maps, $I_r(x,y)$ and $I_d(x,y)$, are obtained from the linear luminance space by the PU coding, where (x,y) denotes the pixel coordinate in the image. In the second stage, the Gabor filter 304 and Butterworth filter 306 are used to extract the local frequency features ($G_r(x,y)$, $G_d(x,y)$) and global frequency features ($B_r(x,y)$, $B_d(x,y)$), respectively. In the third stage, the computed frequency features from the reference and distorted HDR images are compared separately to yield the local and global similarity maps at stage 308. Finally, at stage 310, the two computed similarity maps are combined to generate the predicted quality score using feature pooling strategies which will be explained later in the disclosure.

Referring to the flowchart as shown in FIG. 3, firstly, the reference and distorted HDR images, $I_r$ and $I_d$, are converted to the luminance perceptual space, $L_r$ and $L_d$, in the pre-processing stage. Subsequently, an odd log-Gabor filter is designed to extract local frequency features, $G_r$ and $G_d$, with a spatial mask Mg used to provide higher weights to the over-exposed region. Meanwhile, the Butterworth filter is used to simulate the contrast sensitivity function to highlight the sensitive frequency interval in HVS by the generated mask $M_b$. The global frequency features of the reference and distorted HDR images, $B_r$ and $B_d$, are consisted of the corresponding phase maps and the weighted frequency maps. Finally, the local and global similarities are measured, followed by the feature pooling strategy to predict the quality score.

Preferably, the feature extraction module comprises a Gabor Filter arranged to extract the local frequency feature associated with a high-frequency component of the image, more preferably, the Gabor filter is arranged to extract horizontal and vertical edge features on the image, and wherein the local frequency feature is extracted by applying a spatial mask on the extracted horizontal and vertical edge features with high luminance.

For example, the local frequency feature can be used to extract abundant structural and edge information, where the Gabor filter is greatly consistent with the response of the HVS. Therefore, the Gabor filter for local frequency feature extraction may be adopted. The Gabor filter-based features of reference and distorted HDR images are denoted as $G_r(x,y)$ and $G_d(x,y)$, respectively.

Preferably, the local edge information may be extracted using the odd log-Gabor filter, which can well represent the high-frequency component of nature images, $$G_o(x, y) = \frac{1}{2\pi\sigma_x\sigma_y}\exp\left\{\frac{-1}{2}\left[\log\left(\frac{x'}{\sigma_x}\right)^2 + \log\left(\frac{y'}{\sigma_y}\right)^2\right]\right\}\sin(2\pi fx'), \quad (1)$$

-continued $$\text{where } \begin{array}{l} x' = x\cos\theta + y\sin\theta, \\ y' = y\cos\theta - x\sin\theta, \end{array} \quad (2)$$

where f and $\theta$ denote the frequency and the rotation angle of (x', y'). The standard deviations of the Gaussian envelope in the two directions are represented as $\sigma_x$ and $\sigma_y$, respectively. More specifically, in this work, the rotation angle is set to 0 and $\pi/2$ to extract horizontal and vertical edge features, respectively, and the frequency f is empirically set to 2.5. Furthermore, the HDR images can provide abundant texture information in the bright areas, which enables it to provide the better visual experience compared with the LDR image. Therefore, a spatial mask is applied on the extracted local features, focusing on the high luminance region of HDR images. The designed Gaussian function is applied to obtain the mask, $$M_g = 1 + \frac{1}{2\pi\sigma}\exp\left(\frac{-(L_r - \mu)^2}{2\sigma^2}\right), \quad (3)$$

where $\sigma$ and $\mu$ are empirically set to 0.2 and 250. It is worth mentioning that all feature extraction operations in this work are performed on the luminance of HDR images unless otherwise stated.

Frequency features may be useful for extracting the local texture or edge information of the nature images. However, the direct difference in the frequency domain between the reference and distorted images may also be important. Furthermore, the inventors devised that the contrast sensitivity of the human eye first increases and then decreases with the increase of spatial frequency, which implies that there is a frequency interval where HVS is highly sensitive. Preferably, the Butterworth filter may be applied to simulate the contrast sensitivity function (CSF) to directly extract the global feature from the frequency spectrum of the image.

Preferably, the feature extraction module comprises a Butterworth filter arranged to extract the global frequency feature from a frequency spectrum of the image. More preferably, the Butterworth filter is arranged to compose a frequency map and a phase map associated with image, wherein the frequency map and the phase map are obtained by: obtaining a frequency spectrum representation by performing a Discrete Fourier Transform (DFT) to the image associated with a frequency representation of each pixel of the image in the spatial domain; applying a bandpass Butterworth filter to provide high weights to a predetermined frequency interval; and separating the frequency spectrum representation into real part and imaginary part to obtain the frequency may and the phase map.

For example, given a 2D image, each pixel of its frequency representation is computed from all the pixels in its spatial domain. Therefore, the frequency representation of an image can be regarded as a global feature of the image. Taking the reference HDR image as an example, the corresponding 2D Discrete Fourier transform (DFT) is performed as:

$$F_r(u, v) = \sum_{x=0}^{M-1}\sum_{y=0}^{N-1} L_r(x, y)e^{-j2\pi\left(\frac{ux}{M}+\frac{vy}{N}\right)}, \quad (4)$$

where M and N are the size of the image, (u, v) denotes the pixel coordinate in the frequency spectrum. After shifting the low frequencies to the middle of the frequency spectrum, the log operation is applied to compress the values for better representation. Subsequently, a bandpass Butterworth filter is designed to provide higher weights to the special frequency interval, $$M_b = \left(1 - \frac{1}{1 + (D_1/D)^{2n_1}}\right) \cdot \left(\frac{1}{1 + (D_2/D)^{2n_2}}\right), \tag{5}$$

where $D$ is the Euclidean distance of the 2D grid. In this work, the cut-off frequency and order value $D_1$, $D_2$, $n_1$, and $n_2$ are empirically set to 400, 100, 4 and 2, respectively. The masked frequency map is presented as, $$B_r^f(x, y) = \log(|F_r(u, v)| + 1) \cdot M_b. \tag{6}$$

Moreover, by separating the frequency spectrum into real and imaginary part, i.e., $R_r = \mathrm{Real}(F_r)$ and $I_r = \mathrm{Imag}(F_r)$, the phase map can be obtained as $$B_r^p = \tan^{-1}(I_r/R_r).$$

In the same way, the frequency map $$B_d^f$$

and phase map $$B_d^p$$

of the distorted HDR image can be obtained. Therefore, the Butterworth filter-based global feature is composed of the frequency map and phase map, which is given by, $$B_r(x, y) = \{B_r^f(x, y), B_r^p(x, y)\}; \tag{7}$$

$$B_d(x, y) = \{B_d^f(x, y), B_d^p(x, y)\}.$$

Preferably, the comparison module is arranged to generate a similarity map associated with each of the local frequency feature and the global frequency features of the reference image and the distorted image pair.

Since the generated local and global frequency features are represented in different domains, the feature similarity measurements are conducted on the spatial and frequency domains, respectively. The similarity map of the local frequency features is calculated as follows:

$$S_L(x, y) = \frac{2G_r(x, y) \cdot G_d(x, y) + T_0}{G_r(x, y)^2 + G_d(x, y)^2 + T_0}, \tag{8}$$

where the $T_0$ is a positive constant to prevent the exception that the denominator equals to zero.

For the global feature, the similarity of the frequency map and phase map can be generated as, $$S_g^f(x, y) = \frac{2B_r^f(x, y) \cdot B_d^f(x, y) + T_1}{B_r^f(x, y)^2 + B_d^f(x, y)^2 + T_1}; \tag{9}$$

$$S_g^p(x, y) = \frac{2B_r^p(x, y) \cdot B_d^p(x, y) + T_2}{B_r^p(x, y)^2 + B_d^p(x, y)^2 + T_2},$$

where the $T_1$ and $T_2$ are the positive constants, in analogous to $T_0$. The final similarity map of the global frequency feature is obtained as, $$S_G(x, y) = [S_g^f(x, y)]^\alpha [S_g^p(x, y)]^{(1-\alpha)}, \tag{10}$$

where $\alpha$ is a positive constant used for weighting control of $$S_g^f(x, y) \text{ and } S_g^p(x, y).$$

In this work, $T_0$, $T_1$, $T_2$, and a are empirically set as 0.014, 8, 1, and 0.5, respectively.

Preferably, the scoring module is arranged to perform feature pooling to generate local similarity score and the global frequency similarity score associated with a weighted similarity of all pixels on the distorted image comparing to the reference image, and arranged to obtain a final IQA score by combining the local similarity score and the global frequency similarity score.

In feature maps generated from HDR images using the Gabor filter and Butterworth filter, the larger pixel value implies that the HVS is more sensitive and pays more attention to it. Therefore, the weighted maps for the local and global frequency feature maps can be generated as:

$$W_G(x, y) = \max\{|G_r(x, y)|, |G_d(x, y)|\}; \tag{11}$$

$$W_L(x, y) = \max\{|B_r^f(x, y)|, |B_d^f(x, y)|\}.$$

Therefore, the local frequency similarity score and global frequency similarity score can be calculated as the weighted average over all the pixel locations $(x, y)$ on the corresponding similarity maps as:

$$Q_g(x, y) = \sum_{(x,y)} W_G(x, y) \cdot S_G(x, y) \bigg/ \sum_{(x,y)} W_G(x, y); \tag{12}$$

$$Q_L(x, y) = \sum_{(x,y)} W_L(x, y) \cdot S_L(x, y) \bigg/ \sum_{(x,y)} W_L(x, y).$$

The final quality score is obtained by combining the local similarity score and global frequency similarity score, $$Q_{LGFM} = Q_G(x, y) \cdot Q_L(x, y). \tag{13}$$

These embodiments may be advantageous in that, a novel LGFM is provided for full reference (FR) HDR image quality assessment. The preferred embodiments may be constructed by modeling the HVS-sensitive information with local and global frequency characters to further improve the assessment accuracy.

Advantageously, the odd log-Gabor filter is adopted to extract the local edge and structure features of the images, which is greatly consistent with the response of the HVS. Moreover, the generated spatial mask further guides the feature map to focus on the over-exposed region, where the abundant texture information can provide a superior visual experience.

Moreover, based on the observation that the contrast sensitivity of the human eye first increases and then decreases with the increase of spatial frequency, the Butterworth filter is applied to simulate the CSF to directly extract the global feature from the frequency spectrum of the image.

The present invention may be used for FR HDR IQA to further improve the assessment accuracy, which can be used to optimize the compression efficiency of the HDR content and improve the quality of the HDR image in the HDR contents generation tasks. In addition, the present invention may achieve superior and consistent assessment results with less parameter amount and less running time.

Advantageously, the present invention may be used for optimizing video codec to significantly improve the coding performance, which can be used in video transmission and storage with limited resource.

The inventors also evaluated the performances of the present invention in an example experiment, in which four publicly available datasets are used for performance evaluation. The first three datasets are constructed by subjective experiments, while the fourth dataset consists of two existing datasets using a specifically designed algorithm to align subjective scores.

As suggested in the VQEG HDTV test, a logistic regression function is applied to map the predicted objective scores to a common scale, $$S_i = \gamma_i \left( \frac{1}{2} - \frac{1}{1 + e^{\gamma_2 (q_i - \gamma_3)}} \right) + \gamma_4 q_i + \gamma_5, \tag{14}$$

where $q_i$ and $S_i$ denote the generated quality score of the i-th image from the IQA model and the corresponding mapped score. $\gamma 1$, $\gamma 2$, $\gamma 3$, $\gamma 4$, and $\gamma 5$ are the regression parameters determined by minimizing the sum of squared differences between the predicted objective score Si and corresponding ground truth score (i.e., MOS/DMOS). Subsequently, the Spearman rank order correlations coefficient (SROCC), Kendall rank order correlation coefficient, and root mean square error (RMSE) are adopted to evaluate the performance of various HDR IQA metrics. Note that higher values of SROCC and KROCC represent a stronger correlation, while lower values of RMES indicate smaller differences.

To illustrate the superiority of LGFM, several classic and example IQA metrics are adopted for comparison, including HDR-VDP-3, HDR-VQM, PSNR, SSIM, FSIM, VIF, GMSD, ESIM, GFM, and MSSIM, where the first two algorithms are specifically designed for HDR images, while the other metrics are more suitable for LDR images. In the experiment, HDR images are first converted into perceptual space by PU or PQ coding before applying the LDR IQA metrics. Since the parameters in part of the IQA models (i.e., display and distance parameters in HDR-VDP-3 and HDR-VQM) would affect the final results, the default settings were used during the experiments. Table I as illustrated and presented in FIG. 4, presents the performance comparison of various IQA models on four datasets, where the highlighted in bold represent the first, second, and third ranked performance of the measurement criterions. Compared with the state-of-the-art IQA metrics, the LGFM model in accordance with embodiments of the present invention yields the best overall performance in terms of SROCC, KROCC, and MSE on four datasets. Besides, the HDR-VDP-3, HDR-VQM, and PU-GFM also achieved relatively promising results. Moreover, there is an interesting observation that most of the highlighted values are from PU coding, which indicates that PU encoding performs higher consistency with the HVS compared with the PQ coding.

As show in FIG. 4, there is illustrated TABLE I, which shows the SROCC, KROCC and RMSE comparison of various IQA MODELS on four benchmarks. In the LGFM model, an image quality assessment method for HDR images is provided. The invention utilizes the combination of the local and global frequency features. More specifically, the local feature map is extracted by the Gabor filter to measure the structure similarity, while the global feature map is obtained by simulating the contrast sensitivity function with the Butterworth filter to detect the frequency interval similarity. Subsequently, the feature pooling strategy is adopted to generate the quality scores based on the local and global similarity maps, leading to the final quality score by combing them.

Extensive experiments also demonstrate that each component in the present invention contributes to the final results. Moreover, the system provides higher consistency with the HVS and outperforms other example IQA methods.

Although not required, the embodiments described with reference to the Figures can be implemented as an application programming interface (API) or as a series of libraries for use by a developer or can be included within another software application, such as a terminal or personal computer operating system or a portable computing device operating system. Generally, as program modules include routines, programs, objects, components and data files assisting in the performance of particular functions, the skilled person will understand that the functionality of the software application may be distributed across a number of routines, objects or components to achieve the same functionality desired herein.

It will also be appreciated that where the methods and systems of the present invention are either wholly implemented by computing system or partly implemented by computing systems then any appropriate computing system architecture may be utilized. This will include tablet computers, wearable devices, smart phones, Internet of Things (IoT) devices, edge computing devices, stand alone computers, network computers, cloud-based computing devices and dedicated hardware devices. Where the terms "computing system" and "computing device" are used, these terms are intended to cover any appropriate arrangement of computer hardware capable of implementing the function described.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

Any reference to prior art contained herein is not to be taken as an admission that the information is common general knowledge, unless otherwise indicated.

The invention claimed is:

1. A system for assessing quality of a high-dynamic range (HDR) image, comprising:

a feature extraction module arranged to extract a plurality of frequency features on a pair of reference image and a distorted image generated based on the reference image, wherein the plurality of frequency features includes:

a local frequency feature extracted using an odd log-Gabor filter applied to a luminance component of the image; and a global frequency feature extracted from a frequency spectrum of the image using a Butterworth filter;

a comparison module arranged to compare a pair of feature maps obtained by processing the extracted frequency features on both the reference image and the distorted image, by:

generating a local similarity map by comparing the local frequency feature from the reference image and the distorted image; and generating a global similarity map by comparing the global frequency feature from the reference image and the distorted image; and a scoring module arrange to output an image quality assessment (IQA) score of the distorted image with reference to the reference image provided, by performing feature pooling to generate a local frequency similarity score and a global frequency similarity score associated with a weighted similarity of the distorted image comparing to the reference image based on the local similarity map and the global similarity map, and the IQA score is represented by a combination of the local frequency similarity score and the global frequency similarity score;

wherein the plurality of frequency features are associated with sensitive information in a human visual system (HVS).

2. The system of claim 1, wherein the plurality of frequency features are associated with structural information and/or partial frequencies when a visual scene presented by the image is perceived by a human observer.

3. The system of claim 2, wherein the local frequency feature represents texture details of an image perceived by human eyes.

4. The system of claim 3, wherein the odd log Gabor Filter is arranged to extract the local frequency feature associated with a high-frequency component of the image.

5. The system of claim 4, wherein the Gabor filter is arranged to extract horizontal and vertical edge features on the image, and wherein the local frequency feature is extracted by applying a spatial mask on the extracted horizontal and vertical edge features with high luminance.

6. The system of claim 2, wherein the global frequency feature characterizes a sensitive frequency interval of the HVS.

7. The system of claim 6, wherein the Butterworth filter is arranged to compose a frequency map and a phase map associated with image, wherein the frequency map and the phase map are obtained by:

obtaining a frequency spectrum representation by performing a Discrete Fourier Transform (DFT) to the image associated with a frequency representation of each pixel of the image in the spatial domain;

applying a bandpass Butterworth filter to provide high weights to a predetermined frequency interval; and separating the frequency spectrum representation into real part and imaginary part to obtain the frequency map and the phase map.

8. The system of claim 3, further comprising an image pre-processing module arranged to transfer the reference image and the distorted image to a perceptual space to map a wide range of luminance to a perceptual range of the HVS.

9. The system of claim 8, wherein a luminance map for each of the reference image $I_r(x,y)$ and distorted image $I_d(x,y)$ are obtained from a linear luminance space, wherein $(x,y)$ denotes the pixel coordinate in the image.

10. The system of claim 9, wherein the IQA score is represented as $Q_{LGFM}=Q_G(x,y)\cdot Q_L(x,y)$, wherein $Q_G(x,y)$ and $Q_L(x,y)$ denotes the local frequency similarity score and global frequency similarity score calculated as an weighted average over all the pixel coordinates $(x,y)$ on the corresponding similarity maps.

11. A method for assessing quality of a high-dynamic range (HDR) image, comprising the steps of:

extracting a plurality of frequency features on a pair of reference image and a distorted image generated based on the reference image, wherein the plurality of frequency features includes:

a local frequency feature extracted using an odd log-Gabor filter applied to a luminance component of the image; and a global frequency feature extracted from a frequency spectrum of the image using a Butterworth filter;

comparing a pair of feature maps obtained by processing the extracted frequency features on both the reference image and the distorted image, by:

generating a local similarity map by comparing the local frequency feature from the reference image and the distorted image; and generate a global similarity map by comparing the global frequency feature from the reference image and the distorted image; and outputting an image quality assessment (IQA) score of the distorted image with reference to the reference image provided, by performing feature pooling to generate a local frequency similarity score and a global frequency similarity score associated with a weighted similarity of the distorted image comparing to the reference image based on the local similarity map and the global similarity map, and the IQA score is represented by a combination of the local frequency similarity score and the global frequency similarity score;

wherein the plurality of frequency features are associated with sensitive information in a human visual system (HVS).

12. The method of claim 11, wherein the plurality of frequency features are associated with structural information and/or partial frequencies when a visual scene presented by the image is perceived by a human observer.

13. The method of claim 11, wherein the local frequency feature represents texture details of an image perceived by human eyes.

14. The method of claim 13, wherein the odd log-Gabor Filter is arranged to extract the local frequency feature associated with a high-frequency component of the image.

15. The method of claim 14, wherein the Gabor filter is arranged to extract horizontal and vertical edge features on the image, and wherein the local frequency feature is extracted by applying a spatial mask on the extracted horizontal and vertical edge features with high luminance.

16. The method of claim 12, wherein the global frequency feature characterizes a sensitive frequency interval of the HVS.

17. The method of claim 16, wherein the Butterworth filter is arranged to compose a frequency map and a phase map associated with image, wherein the frequency map and the phase map are obtained by:

obtaining a frequency spectrum representation by performing a Discrete Fourier Transform (DFT) to the image associated with a frequency representation of each pixel of the image in the spatial domain;

applying a bandpass Butterworth filter to provide high weights to a predetermined frequency interval; and separating the frequency spectrum representation into real part and imaginary part to obtain the frequency map and the phase map.

18. The method of claim 13, further comprising a step of preforming pre-processing of the reference image and the distorted image by transferring the reference image and the distorted image to a perceptual space to map a wide range of luminance to a perceptual range of the HVS.

19. The method of claim 18, wherein the step of preforming pre-processing of the reference image and the distorted image further comprising the step of obtaining a luminance map for each of the reference image $I_r(x,y)$ and distorted image $I_d(x,y)$ from a linear luminance space, wherein (x,y) denotes the pixel coordinate in the image.

20. The method of claim 19, wherein the IQA score is represented as $Q_{LGFM}=Q_G(x,y)\cdot Q_L(x,y)$, wherein $Q_G(x,y)$ and $Q_L(x,y)$ denotes the local frequency similarity score and global frequency similarity score calculated as an weighted average over all the pixel coordinates (x,y) on the corresponding similarity maps.

* * * * *